Patented May 25, 1943

2,319,808

UNITED STATES PATENT OFFICE 2,319,808

STEROL DERIVATIVES AND PROCESS FOR PRODUCING SAME

Erhard Fernholz, Princeton, and Homer E. Stavely, Highland Park, N. J., assignors to E. R. Squibb & Sons, New York, N. Y., a corporation of New York No Drawing. Application August 31, 1939, Serial No. 292,892

4 Claims. (Cl. 260—397.2)

This invention relates to, and has for its object the provision of, 22,23-dichlorides and (especially) 22,23-dibromides of the stigmasterol series, and a process for preparing them. These compounds are to be used as intermediates for the production of therapeutically important compounds of the steroid class, e. g., corpus luteum, adrenal, and testis hormones.

In the following description and claims, the nomenclature and numbering system employed is that established by the American Chemical Society monograph Chemistry of Natural Products related to Phenanthrene, by L. F. Fieser, published in 1936 by Reinhold Publishing Corporation, New York City. Thus, the "stigmasterol series" designates the derivatives of stigmastadiene of which 3-hydroxy-stigmastadine (stigmasterol) is the representative member.

The compounds of this invention include, inter alia, the 22,23-dichlorides and (especially) 22,23-dibromides of stigmasterol esters (notably stigmasteryl acetate), of stigmasterol, and of stigmastadienone. The 22,23-dichlorides and 22,23-dibromides of stigmasterol esters are prepared from the corresponding tetrahalides by partial dehalogenation. Thus, the 22,23-dibromide of a lower fatty acid ester of stigmasterol (e. g., the acetate or propionate) is prepared from the tetrabromide of the corresponding ester by reaction with sodium iodide at substantially room temperature, preferably for about 15–25 hours, and other 22,23-dichlorides and 22,23-dibromides of the stigmasterol series may be prepared from these stigmasterol ester dihalides by the procedures generally used for the conversion of one compound of the stigmasterol series into another member of the series; e. g., the stigmasterol ester dihalide may be saponified to obtain the corresponding stigmasterol 22,23-dichloride or 22,23-dibromide, and the latter may be dehydrogenated to obtain the corresponding stigmastadienone 22,23-dichloride or 22,23-dibromide.

The partial dehalogenation may be effected with alkali iodides other than (the preferred) sodium iodide, e. g., with potassium, ammonium, lithium, calcium, strontium, or barium iodide.

The following examples are illustrative of the invention:

EXAMPLE 1

Preparation of stigmasteryl acetate 22-23-dibromide 3 g. of sodium iodide in 25 cc. of ethanol is added to 5 g. of stigmasteryl acetate tetrabromide in 75 cc. of benzene, and the mixture is allowed to stand at room temperature for twenty hours. The mixture is then shaken with sodium sulfite to remove free iodine, washed with water, dried over sodium sulfate, concentrated, and filtered; and the resulting precipitate is crystallized from benzene-ethanol, and obtained as fine needles melting at 212–213° C. $[\alpha]^{25}_D$ —30° (15.3 mg. in 2.0 cc. chloroform 1 dm. tube, $\alpha_D$ —0.23°). The yield of pure stigmasteryl acetate 22,23-dibromide is 60%.

A lower melting mixture may be isolated from the mother liquor, reconverted into stigmasteryl acetate tetrabromide, and resubjected to debromination.

EXAMPLE 2

Preparation of stigmastadienone 22,23-dibromide 1 g. of stigmasteryl acetate 22,23-dibromide is refluxed with 5% potassium hydroxide in methanol for two hours. After addition of water, extraction is made with ether, and the ether solution is washed, dried over sodium sulfate, evaporated to dryness, and crystallized twice from benzene-ethanol; the product is obtained as needles, melting at 209–210° C.

EXAMPLE 3

Preparation of stigmasterol 22,23-dibromide 3.6 g. of stigmasterol 22,23-dibromide, 5 g. aluminum tertiary butylate, 150 cc. dry benzene, and 40 cc. dry acetone are refluxed together for 12–16 hours. The mixture is washed with dilute sulfuric acid, then with water until neutral, dried over sodium sulfate, and evaporated to dryness in a vacuum, and the residue is crystallized from acetone, giving 2.6 g. of material melting at 173–178° C. After recrystallizing many times, the melting point of the product becomes constant at 182–184° C. $[\alpha]_D$ +53° (18.8 mg. in 2.0 cc. chloroform, 1 dm. tube, $\alpha_D$ +0.50°).

The invention may be variously otherwise embodied within the scope of the appended claims.

We claim:

1. Stigmastadienone 22,23-dibromide.

2. The process of preparing a compound of the group consisting of the 22,23-dichlorides and the 22,23-dibromides of stigmasterol and stigmastadienone, which comprises reacting a compound of the group consisting of the tetrachlorides and tetrabromides of stigmasterol esters with an alkali iodide at substantially room temperature, and converting the resulting 22,23-dihalo stigmasterol ester into the corresponding 22,23-dihalo stigmasterol by reaction with an alcoholic alkali for a short time.

3. The process of preparing stigmasterol 22,23-dibromide which comprises reacting the tetrabromide of a stigmasterol ester with an alkali iodide at substantially room temperature, and converting the resulting 22,23-dibromo-stigmasterol ester into stigmasterol 22,23-dibromide by heating with alcoholic potassium hydroxide for several hours.

4. The process of preparing stigmastadienone 22,23-dibromide which comprises reacting the tetrabromide of a stigmasterol ester with an alkali iodide at substantially room temperature, converting the resulting 22,23-dibromostigmasterol ester into stigmasterol 22,23-dibromide by reaction with an alcoholic alkali for a short time, and converting the latter into stigmastadienone 22,23-dibromide by dehydrogenation.

ERHARD FERNHOLZ.
HOMER E. STAVELY.